No. 737,588. PATENTED SEPT. 1, 1903.
W. A. DAVIS.
SEEDER AND FERTILIZER DISTRIBUTER.
APPLICATION FILED OCT. 7, 1902.
NO MODEL. 3 SHEETS—SHEET 2.
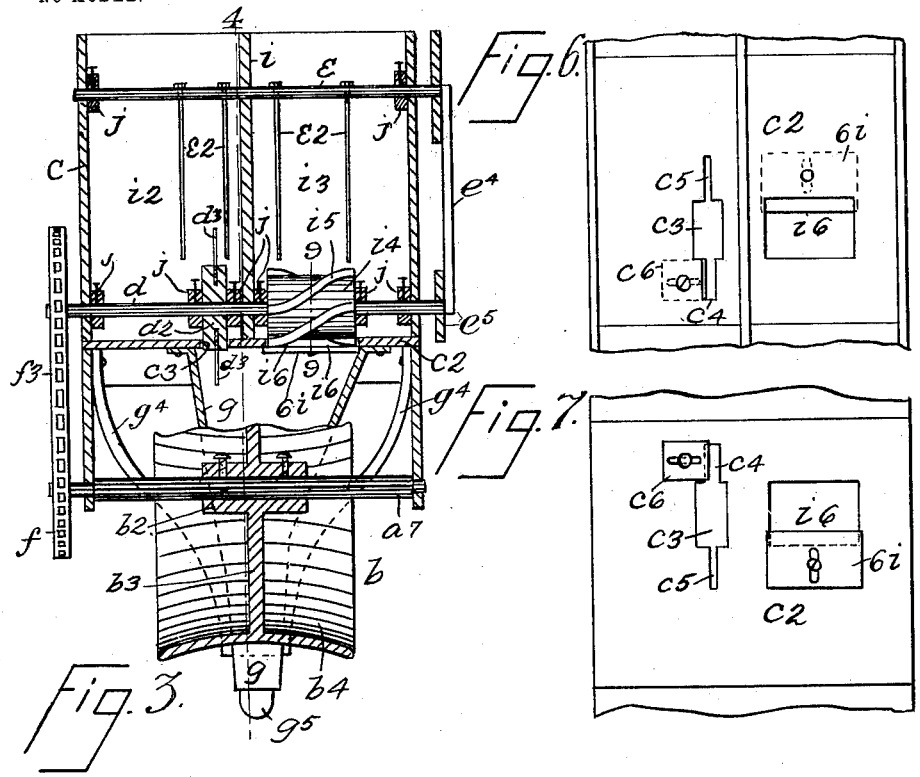
WITNESSES
INVENTOR
Wm Arnold Davis
BY
Edgar Tate & Co
ATTORNEYS

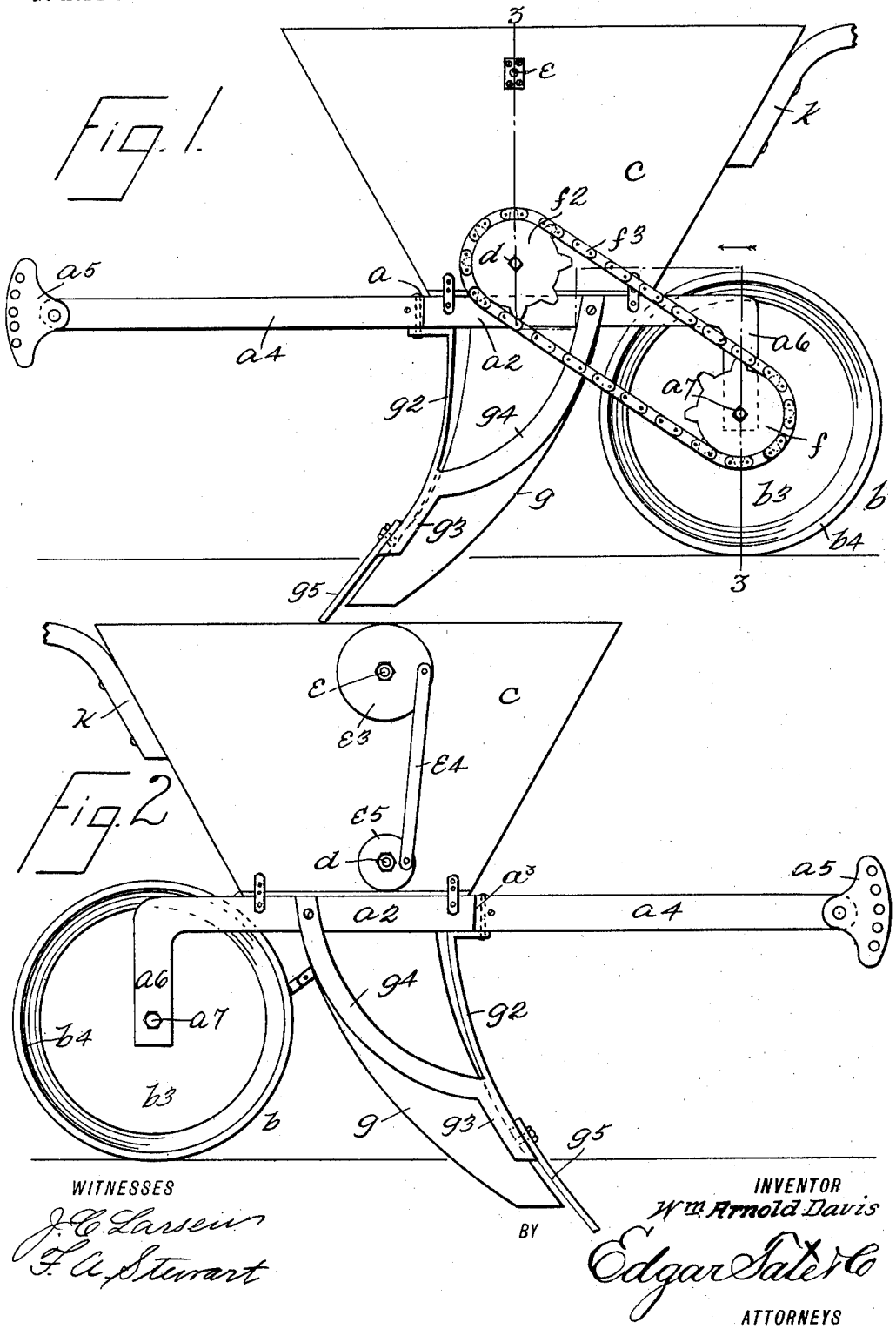

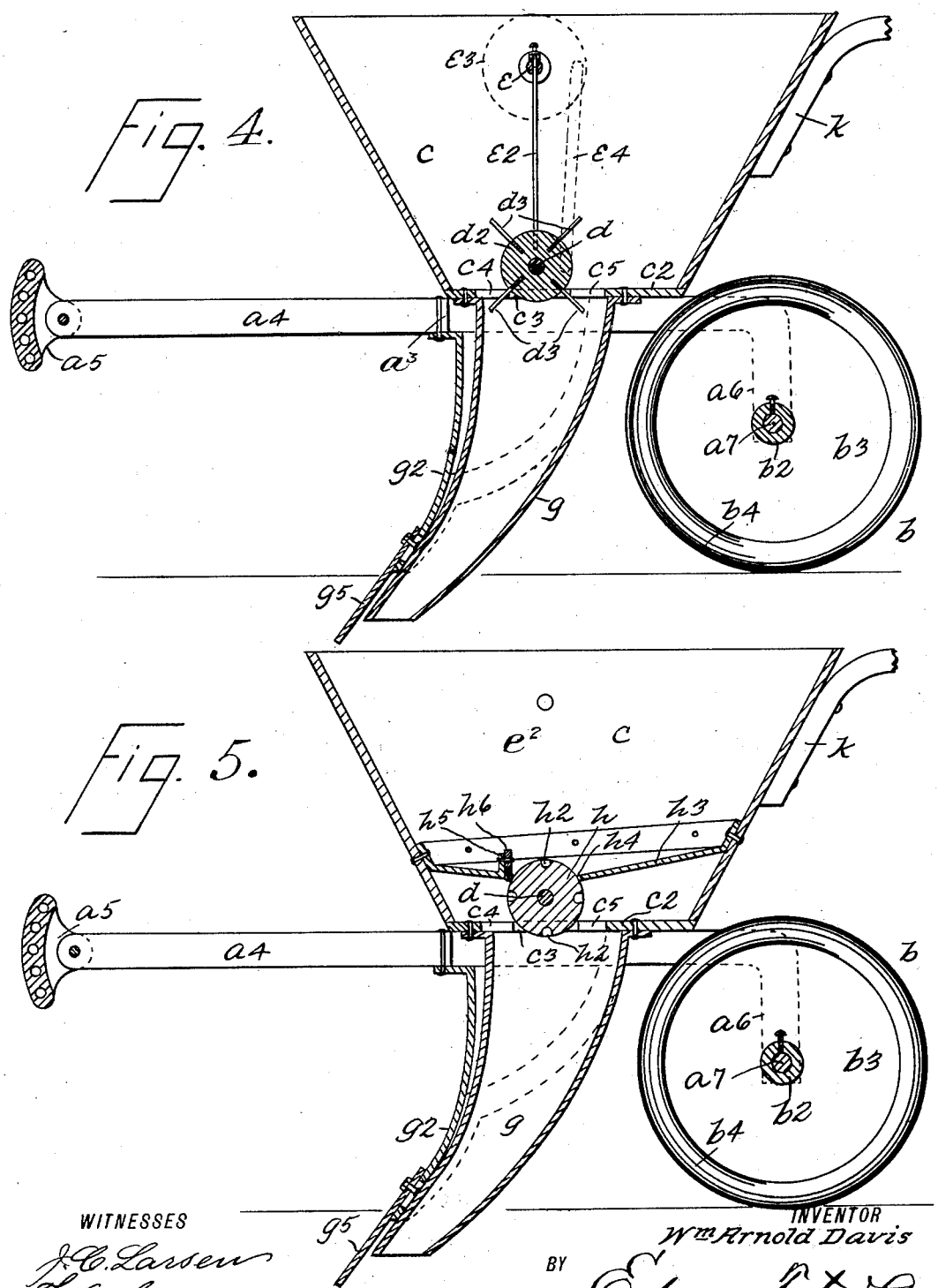

No. 737,588. Patented September 1, 1903.

UNITED STATES PATENT OFFICE.

WILLIAM ARNOLD DAVIS, OF CHAPELHILL, ALABAMA.

SEEDER AND FERTILIZER-DISTRIBUTER.

SPECIFICATION forming part of Letters Patent No. 737,588, dated September 1, 1903.

Application filed October 7, 1902. Serial No. 126,268. (No model.)

*To all whom it may concern:*

Be it known that I, WILLIAM ARNOLD DAVIS, a citizen of the United States, residing at Chapelhill, in the county of Chambers and State of Alabama, have invented certain new and useful Improvements in Seeders and Fertilizers, of which the following is a full and complete specification, such as will enable those skilled in the art to which it appertains to make and use the same.

The object of this invention is to provide an improved seeder for use in sowing or planting cotton and other seeds which may also be used as a fertilizer or for the purpose of sowing or distributing fertilizing material in connection with seeds; and with these and other objects in view the invention consists in a seeder or seeding-machine constructed as hereinafter described and claimed.

The invention is fully disclosed in the following specification, of which the accompanying drawings form a part, in which the separate parts of my improvement are designated by suitable reference characters in each of the views, and in which—

Figure 1 is a left-hand side elevation of my improved seeding-machine; Fig. 2, a right-hand side elevation thereof; Fig. 3, a section on the line 3 3 of Fig. 1; Fig. 4, a section on the line 4 4 of Fig. 3 and showing my improved seeding-machine as designed for sowing cotton-seeds; Fig. 5, a view similar to Fig. 4, but showing the machine as designed for planting or sowing corn-seeds; Fig. 6, a top plan view of the bottom of the hopper of the machine as shown in Fig. 3; Fig. 7, a bottom plan view thereof; Fig. 8, a plan view of a false bottom in the hopper which I employ when the machine is designed for sowing or planting corn; Fig. 9, a section on the line 9 9 of Fig. 3; and Fig. 10, a face view of a seed-wheel which is also shown in section in Fig. 5.

In the practice of my invention I provide a main frame $a$, which is preferably rectangular and yoke-shaped in form and comprised of two side parts $a^2$ and a front cross-head $a^3$, from which projects forwardly a beam $a^4$, with which is connected an ordinary clevis $a^5$, and the rear ends of the side members $a^2$ of the main frame are bent downwardly at $a^6$, and mounted therein is a shaft $a^7$, centrally of which is journaled a wheel $b$, comprising a central hub $b^2$, a central web portion or spokes $b^3$, and a rim $b^4$, which is concave on its outer surface in cross-section, as clearly shown in Fig. 3, whereby an annular groove or space is formed in the rim of said wheel, the object of which is to throw the dirt together over the seed in the operation of the machine, as hereinafter described.

Placed on the frame $a$ is a hopper $c$, provided with a bottom $c^2$, and said hopper is divided by a central partition $i$ into two separate compartments $i^2$ and $i^3$, and the compartment $i^2$ is intended for seed and the compartment $i^3$ for fertilizing material, and mounted in said hopper, transversely thereof, is a shaft $e$, having downwardly-directed fingers or stirrers $e^2$ in both of said chambers, and the shaft $e$ is also provided with collars $j$ adjacent to the opposite sides of the hopper, which are held in place thereon by set-screws and which prevent the longitudinal movement of said shaft.

Passing transversely through the bottom portion of the hopper and at a predetermined distance above the bottom $c^2$ thereof is a shaft $d$, which is geared in connection with the axle $a^7$ by means of a sprocket-wheel $f$ on the axle, a similar wheel $f^2$ on the shaft $d$, and a drive-chain $f^3$, mounted on said wheels.

The bottom $c^2$ of the hopper is provided beneath the chamber $i^3$ with a large rectangular opening $i^6$, transversely arranged, and beneath the chamber $i^2$ of the hopper said bottom is provided with a rectangular opening $c^3$, which ranges forwardly and backwardly and is provided at the forward end with a slot or extension $c^4$ and at the rearward end with a slot or extension $c^5$, and the forwardly-directed slot or extension $c^4$, or the size thereof, may be regulated by means of a plate $c^6$, adjustably mounted on the bottom $c^2$ of the hopper, as shown in Figs. 6 and 7.

The shaft $e$ is provided at one side of the hopper with a crank-wheel $e^3$ and the shaft $d$ with a similar or smaller crank-wheel $e^5$, and these wheels are connected by a link $e^4$, which is eccentrically pivoted to one side thereof, as clearly shown in Fig. 2, and by means of the construction herein shown and described in the operation of the machine the shaft $d$ is revolved while the shaft $e$ and fingers $e^2$ are oscillated.

The shaft $d$ is provided over the opening $i^6$ in the bottom $c^2$ of the hopper with a short cylinder or drum $i^4$, which is turned by said shaft and which is provided with spiral ribs $i^5$, and the bottom portion of said cylinder or drum and said spiral ribs turn in the opening $i^6$ in the operation of the machine, and said cylinder or drum is designed to feed the fertilizing material from the chamber $i^3$ into the spout $g$, which is secured to the bottom of the hopper and which extends downwardly and forwardly, preferably to a point slightly below the wheel $b$, and through which the seed and fertilizing material are discharged in the operation of the machine, and connected with the beam $a^4$ slightly in front of the upper end of the spout $g$ is a hanger $g^2$, the lower end of which extends downwardly over or in front of the spout $g$ and the side walls of which are preferably curved backwardly at the edges thereof, as shown at $g^3$, so as to inclose the front portion of said spout, and said hanger is also preferably provided with upwardly and backwardly directed bracing-arms $g^4$, which are connected with the sides of the main frame, and connected with the lower front portion of the hanger $g^2$ is a plow $g^5$, which projects slightly below the lower end of the spout $g$ and which in practice forms a furrow in which the seeds and fertilizing material are discharged. This hanger or frame in addition to carrying the plow acts as a protector to the end of the spout.

The shaft $d$ within the chamber $i^2$ is also provided with a seed disk or wheel $d^2$, which in the form of construction shown in Figs. 3 and 4, or when the machine is designed for sowing or seeding cotton, is provided with radially-arranged fingers $d^3$, which when the shaft $d$ and disk or wheel $d^2$ are turned pass through the slots or extensions $c^4$ and $c^5$ of the opening $c^3$ in the bottom $c^2$ of the hopper, and the said disk or wheel $d^2$ extends downwardly into the opening $c^3$.

Secured to the shaft $d$ at the opposite ends of the cylinder or drum $i^4$ and at the opposite sides of the disk or wheel $d^2$ are collars $j$, which hold said cylinder or drum and said disk or wheel in proper position, and similar collars $j$ are connected with said shaft adjacent to the opposite sides of the hopper, so as to prevent the longitudinal movement of said shaft.

Constructed as hereinbefore described my improved seeder and fertilizer-distributer is designed for sowing cotton or planting cottonseed, and in practice the cotton-seeds are placed in the chamber $i^2$ and the fertilizing material in the chamber $i^3$, and the machine is drawn by a horse or in any desired manner. In this operation the shaft $d$ is turned by the axle $a^7$, with which it is geared, and the shaft $e$ is oscillated by the link $e^4$ and the disks, rings, or similar devices $e^3$ and $e^5$, which are secured, respectively, to the shafts $e$ and $d$. In this operation the cotton-seed is fed in the required manner through the bottom of the chamber $i^2$ into the spout $g$, and at the same time the fertilizing material is similarly fed through the bottom of the chamber $i^3$ into said spout, and the wheel or disk $d^2$ and the cylinder or drum $i^4$ may be so regulated in their form and construction as to feed said seed and said fertilizing material in the exact proportions required.

When I desire to use my improved seeding-machine for the purpose of sowing or planting corn, I modify the chamber $e^2$, as shown in Fig 5, by placing therein a supplemental bottom $h^3$, having an opening $h^4$, which ranges forwardly and backwardly and at the front of which is an upright member $h^5$, to which is secured a brush $h^6$, and on the shaft $d$ I place a seed-wheel $h$, which turns in the opening $h^4$, the bottom of which turns in the opening $c^3$ in the main bottom plate $c^2$ of the hopper, and the brush $h^6$ bears on the perimeter of the wheel $h$ and removes therefrom all seed except the seed contained in the pockets $h^2$, with which said wheel is provided. The operation of this form of construction will be the same as that hereinbefore described, with the exception that the seed is deposited at regular intervals, the amount of the seed deposited at each interval depending upon the size of the pockets or recesses $h^2$ in the wheel $h$ and the spaces between said intervals depending on the number of said pockets or recesses in the wheel $h$ and on the size of said wheel and the rapidity with which the shaft $d$ is revolved.

The disk or wheel $h$ is shown on an enlarged scale in Fig. 10, and the cylinder or drum $i^4$ is shown in section in Fig. 9, and changes in and modifications of these features of the invention may be made, as desired.

The supplemental bottom $h^3$ may be employed whenever designed for the purpose specified, and any suitable means may be provided for securing it in the hopper, and it will also be apparent that the disk or wheel $h$ may be substituted for the disk or wheel $d^2$ whenever necessary, and by reason of this construction the machine may be changed from a cotton seeder or planter to a corn seeder or planter whenever necessary.

The machine is also provided with handles $k$ in the manner of an ordinary plow or similar agricultural implement, and the machine is operated in the same manner as other seeders of this class.

The said machine is also simple in construction and comparatively inexpensive and perfectly adapted to accomplish the result for which it is intended, and changes in and modifications of the construction described may be made without departing from the spirit of my invention or sacrificing its advantages.

Having fully described my invention, what I claim as new, and desire to secure by Letters Patent, is—

1. In an interchangeable corn or cotton seed planter and fertilizer-distributer, a two-compartment hopper mounted upon a suitable frame, a wheel, having a broadened concave periphery, journaled to the said frame and adapted to carry the said frame and hopper and concentrate the earth over the seed and fertilizing material after same have been deposited, a downwardly and forwardly extending discharge-spout secured to the said hopper and connecting with the compartments of same, and a forwardly-extending reinforcing-frame provided with a plow and secured to the hopper-frame and adapted to protect the lower end of the discharging-spout, substantially as shown and described.

2. In an interchangeable corn or cotton seed planter and fertilizer-distributer, a two-compartment hopper mounted upon a suitable frame, a wheel having a broadened concave periphery journaled to the said frame and adapted to carry the said frame and hopper and concentrate the earth over the seed and fertilizing material after same have been deposited, a downwardly and forwardly extending discharge-spout secured to the said hopper and connecting with the compartments of same, a forwardly - extending reinforcing-frame provided with a plow and secured to the hopper-frame and adapted to protect the lower end of the discharging-spout, and means for feeding the seed and fertilizing material to the said discharge - spout, substantially as shown and described.

In testimony that I claim the foregoing as my invention have signed my name, in presence of the subscribing witnesses, this 1st day of October, 1902.

WM. ARNOLD DAVIS.

Witnesses:
J. J. ROBINSON,
J. A. WILLIAMS.